US008126953B2

(12) United States Patent
Shih (10) Patent No.: US 8,126,953 B2
(45) Date of Patent: Feb. 28, 2012

(54) MULTI-PORT MIXED-RADIX FFT

(75) Inventor: Garret Webster Shih, Brookline, MA (US)

(73) Assignee: QUALCOMM Incorporated, San Diego, CA (US)

( * ) Notice: Subject to any disclaimer, the term of this patent is extended or adjusted under 35 U.S.C. 154(b) by 1299 days.

(21) Appl. No.: 11/741,421

(22) Filed: Apr. 27, 2007

(65) Prior Publication Data

US 2007/0288542 A1    Dec. 13, 2007

Related U.S. Application Data

(60) Provisional application No. 60/795,778, filed on Apr. 28, 2006.

(51) Int. Cl.
    *G06F 15/00*    (2006.01)
(52) U.S. Cl. ......................... 708/404; 708/408
(58) Field of Classification Search .................. 708/404, 708/408
    See application file for complete search history.

(56) References Cited

U.S. PATENT DOCUMENTS

| | | | | |
|---|---|---|---|---|
| 4,689,762 | A * | 8/1987 | Thibodeau, Jr. | 708/409 |
| 5,293,330 | A * | 3/1994 | Sayegh | 708/406 |
| 5,473,556 | A | 12/1995 | Aguilar et al. | |
| 6,247,034 | B1 * | 6/2001 | Nakai et al. | 708/409 |
| 2006/0010188 | A1 * | 1/2006 | Solomon et al. | 708/400 |
| 2006/0075010 | A1 * | 4/2006 | Wadleigh et al. | 708/404 |
| 2006/0288068 | A1 | 12/2006 | Uehara | |

FOREIGN PATENT DOCUMENTS

WO    2004004265    1/2004

OTHER PUBLICATIONS

Demuth, "Algorithms for Defining Mixed Radix FFT Flow Graphs," IEEE Transactions on Acoustics, Speech and Signal Processing, Sep. 1, 1989, pp. 1349-1358, vol. 37, No. 9, IEEE Inc., New York, USA, XP000054412.

(Continued)

*Primary Examiner* — Chuong D Ngo
(74) *Attorney, Agent, or Firm* — Qualcomm Patent Group; James H. Yancey, Jr.; Dmitry R. Milikovsky (57) ABSTRACT

A processor for performing a fast Fourier transform or inverse fast Fourier transform comprises a radix-2 butterfly structure; and a radix-4 butterfly structure. A method of performing a fast Fourier transform or inverse fast Fourier transform comprises selectively performing a radix-2 butterfly operation on an input data stream; and selectively performing a radix-4 butterfly operation on one of a result produced by the radix-2 butterfly operation and the input data stream. Apparatus for performing a fast Fourier transform or inverse fast Fourier transform comprises means for selectively performing a radix-2 butterfly operation on an input data stream; and means for selectively performing a radix-4 butterfly operation on one of a result produced by the radix-2 butterfly operation and the input data stream. A communication device for transmitting or receiving information, including an inverse fast Fourier transform module or fast Fourier transform module, comprises a radix-2 butterfly structure having inputs and outputs; a radix-4 butterfly structure having inputs coupled to the radix-2 butterfly structure outputs; and a multiplexer alternately coupling the data stream to the inputs of the radix-2 butterfly structure or to the inputs of the radix-4 butterfly structure, whereby the module can perform two different resolution inverse fast Fourier transforms or fast Fourier transforms dependent on the inputs selected.

26 Claims, 6 Drawing Sheets

OTHER PUBLICATIONS

International Search Report, PCT/US2007/067668, International Searching Authority, European Patent Office, Jan. 5, 2009.

Written Opinion, PCT/US2007/067668, International Searching Authority, European Patent Office, Jan. 5, 2009.

International Preliminary Report on Patentability, PCT/US2007/067668, The International Bureau of WIPO, Geneva, Switzerland, Jan. 13, 2009.

* cited by examiner

MULTI-PORT MIXED-RADIX FFT

CROSS-REFERENCE TO RELATED APPLICATION

The present Application for Patent claims domestic priority under 35 U.S.C. §119(e) to Provisional Application No. 60/795,778 entitled "Multi-Port Mixed-Radix FFT" filed Apr. 28, 2006, and assigned to the assignee hereof, and hereby expressly incorporated by reference herein.

BACKGROUND

1. Field

Aspects described herein relate generally to methods and apparatus for performing Fast Fourier Transforms (FFTs) and Inverse-FFTs (IFFTs). More particularly, aspects relate to performing FFTs and IFFTs with different resolution using one set of common hardware.

2. Background

FFTs and IFFTs are extensively used in the communication arts, especially in wireless communication. Aspects of embodiments disclosed herein are application in many types of communication systems in which the conditions for application can be found. Because aspects are to be described in connection with exemplary embodiments in the field of wireless communication under the IEEE 802.11n standard as published at the time this application is filed, incorporated herein by reference, some features of systems complaint with IEEE 802.11n are described.

Systems compliant with IEEE 802.11n have two channelization modes, a 20 MHz mode and a 40 MHz mode. These modes are provided in support of the Multiple Input, Multiple Output (MIMO) antenna architecture of the system. Conventionally, in order to create a stream of orthogonal data symbols, i.e., a stream of symbols distinguishable by a receiver, a 64-pt FFT and IFFT (one at the transmitter and one at the receiver) is used with a 20 MHz channelization rate. Conventionally, in order to support a 40 MHz channelization rate, twice the resolution would be needed, requiring use of a 128-pt FFT and IFFT.

SUMMARY

According to aspects of an embodiment, a processor for performing a fast Fourier transform or inverse fast Fourier transform comprises a radix-2 butterfly structure; and a radix-4 butterfly structure. According to aspects of an embodiment, inputs are coupled to the radix-2 butterfly structure and outputs of the radix-2 butterfly structure are coupled to inputs of the radix-4 butterfly structure. According to yet further aspects, alternate inputs are coupled to the inputs of the radix-4 butterfly structure, whereby the processor can perform two different resolution fast Fourier transforms dependent on the inputs selected. The processor may further comprise a GPAP interface.

According to aspects of another embodiment, a method of performing a fast Fourier transform or inverse fast Fourier transform comprises selectively performing a radix-2 butterfly operation on an input data stream; and selectively performing a radix-4 butterfly operation on one of a result produced by the radix-2 butterfly operation and the input data stream.

According to aspects of yet another embodiment, apparatus for performing a fast Fourier transform or inverse fast Fourier transform comprises means for selectively performing a radix-2 butterfly operation on an input data stream; and means for selectively performing a radix-4 butterfly operation on one of a result produced by the radix-2 butterfly operation and the input data stream.

According to aspects of a further embodiment, a communication device for transmitting information, including an inverse fast Fourier transform module, comprises a radix-2 butterfly structure having inputs and outputs; a radix-4 butterfly structure having inputs coupled to the radix-2 butterfly structure outputs; and a multiplexer alternately coupling the data stream to the inputs of the radix-2 butterfly structure or to the inputs of the radix-4 butterfly structure, whereby the module can perform two different resolution inverse fast Fourier transforms dependent on the inputs selected.

According to aspects of an additional embodiment, a communication device for receiving information, including a fast Fourier transform module, comprises a radix-2 butterfly structure having inputs and outputs; a radix-4 butterfly structure having inputs coupled to the radix-2 butterfly structure outputs; and a multiplexer alternately coupling the data stream to the inputs of the radix-2 butterfly structure or to the inputs of the radix-4 butterfly structure, whereby the module can perform two different resolution fast Fourier transforms dependent on the inputs selected.

BRIEF DESCRIPTION OF THE DRAWINGS

In the drawings, each identical or nearly identical component that is illustrated in various figures is represented by a like numeral. For purposes of clarity, not every component may be labeled in every drawing. In the drawings.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Various embodiments may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor; or these computer systems may be special-purpose systems, for example including embedded systems found in or comprising wireless communication systems such as cellular phones, 802.11x wireless communication systems and others including one or more processors. It should be appreciated that one or more of any type computer system may be combined to perform the FFT and IFFT according to various embodiments. That is, the system may be located on a single computer or device, or may be distributed among a plurality of computers or devices attached by a communications network.

A computer system according to one embodiment is configured to perform any of the described FFT and IFFT functions. It should be appreciated that the system may perform other functions, including wireless or wired network communication, and embodiments are not limited to having any particular function or set of functions.

Figure 1:
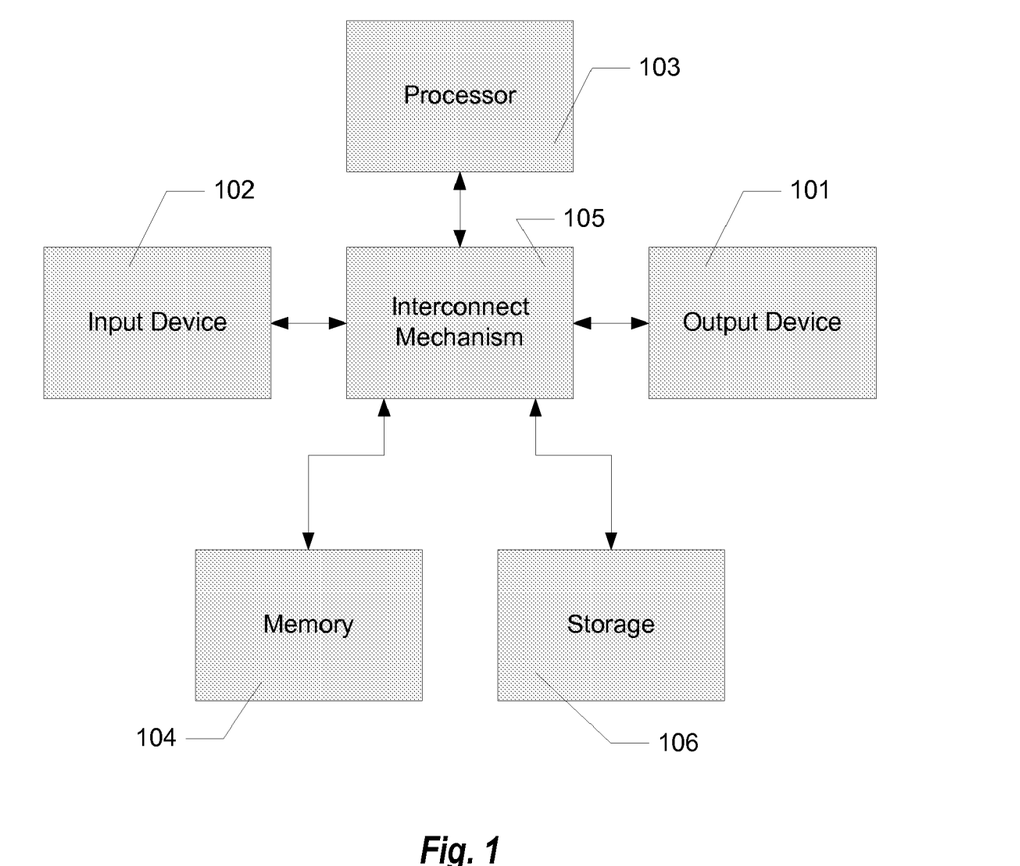
FIG. 1 is a block diagram of a computer system or processor connection with which aspects of embodiments are described.

For example, various aspects of embodiments may be implemented as specialized software executing in a general-purpose computer system 100 such as that shown in FIG. 1. The computer system 100 may include a processor 103 connected to one or more memory devices 104, such as a disk drive, memory, nonvolatile memory or other device for storing data. Memory 104 is typically used for storing programs, firmware and data during operation of the computer system 100. Components of computer system 100 may be coupled by an interconnection mechanism 105, which may include one or more busses (e.g., between components that are integrated within a same machine) and/or a network (e.g., between components that reside on separate discrete machines). The interconnection mechanism 105 enables communications (e.g., data, instructions) to be exchanged between system components of system 100. The network may be wired or wireless.

Computer system 100 also includes one or more input devices 102, for example, a keyboard, mouse, trackball, microphone, touch screen, and one or more output devices 101, for example, a printing device, display screen, speaker. In addition, computer system 100 may contain one or more interfaces (not shown) that connect computer system 100 to a communication network (in addition to or as an alternative to the interconnection mechanism 105.

Figure 2:
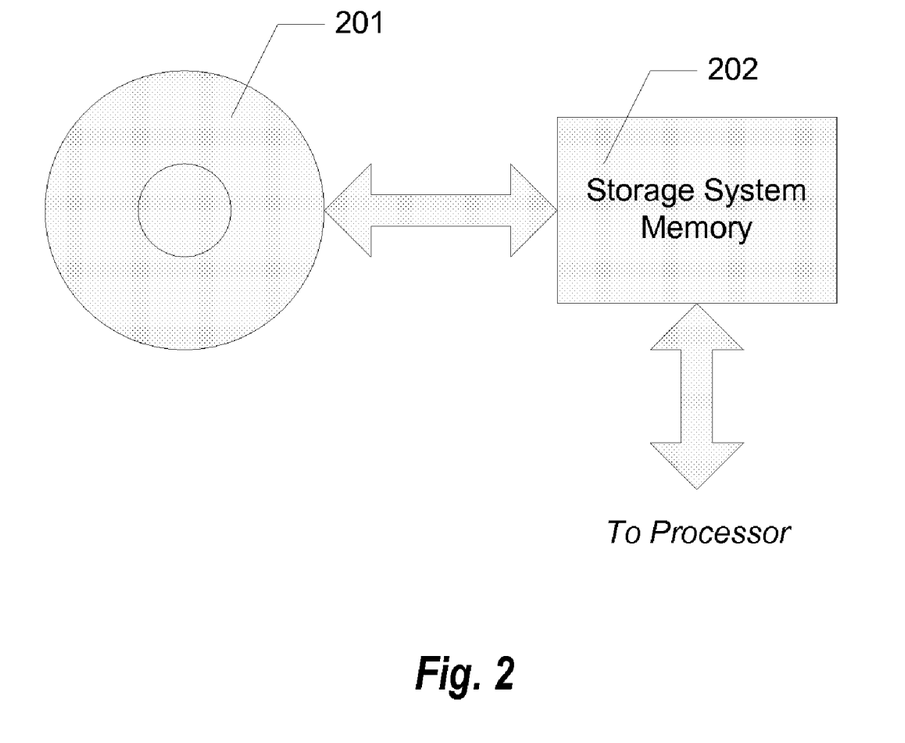
FIG. 2 is a block diagram of a memory subsystem of the computer system of FIG. 1.

The storage system 106, shown in greater detail in FIG. 2, typically includes a computer readable and writeable nonvolatile recording medium 201 in which signals are stored that define a program to be executed by the processor or information stored on or in the medium 201 to be processed by the program. The medium may, for example, be a disk or flash memory. Typically, in operation, the processor causes data to be read from the nonvolatile recording medium 201 into another memory 202 that allows for faster access to the information by the processor than does the medium 201. This memory 202 is typically a volatile, random access memory such as a dynamic random access memory (DRAM) or static memory (SRAM). It may be located in storage system 106, as shown, or in memory system 104, not shown. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and embodiments are not limited thereto. Embodiments are also not limited to a particular memory system 104 or storage system 106.

The computer system may include specially-programmed, special-purpose hardware, for example, an application-specific integrated circuit (ASIC). Aspects of embodiments may be implemented in software, hardware or firmware, or any combination thereof. Further, such methods, acts, systems, system elements and components thereof may be implemented as part of the computer system described above or as an independent component.

Although computer system 100 is shown by way of example as one type of computer system upon which various aspects of embodiments may be practiced, it should be appreciated that aspects of embodiments are not limited to being implemented on the computer system as shown in FIG. 1. Various aspects of embodiments may be practiced on one or more computers having a different architecture or components than shown in FIG. 1.

Computer system 100 may be a general-purpose computer system that is programmable using a high-level computer programming language. Computer system 100 may be also implemented using specially programmed, special purpose hardware. In computer system 100, processor 103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. Many other operating systems may be used, including those specifically designed for mobile and stationary, wireless communication devices.

The processor and operating system together define a computer platform for which application programs in high-level programming languages are written. It should be understood that embodiments are not limited to a particular computer system platform, processor, operating system, or network. Also, it should be apparent to those skilled in the art that embodiments are not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of embodiments may be distributed among one or more computer systems configured to provide a service (e.g., servers) to one or more client computers, or to perform an overall task as part of a distributed system. For example, various aspects of embodiments may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP).

It should be appreciated that embodiments are not limited to executing on any particular system or group of systems. Also, it should be appreciated that embodiments are not limited to any particular distributed architecture, network, or communication protocol.

Various embodiments may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of embodiments may be implemented in a non-programmed environment (e.g., documents created in HTML, XML or other format that, when viewed in a window of a browser program, render aspects of a graphical-user interface (GUI) or perform other functions). Various aspects of embodiments may be implemented as programmed or non-programmed elements, or any combination thereof.

Aspects of embodiments are now explained in connection with an exemplary application to communication equipment in an 802.11n wireless environment.

The 802.11n specification allows for both 20 MHz and 40 MHz channelization. Conventional devices use a 64-pt I/FFT as a means of creating orthogonal data in a 20 MHz channel. Hence, conventional thinking suggests supporting both modes requires the use of a 64-pt FFT for 20 MHz channelization and a 128-pt FFT for 40 MHz channelization. Such an approach would be applicable for any targeted RF band (e.g. 2.4 GHz, 5 GHz).

It has been discovered that, in certain aspects, a mixed-radix implementation optimizes dataflow and addressing techniques to allow both operations to execute within the same architecture and memory space. Additionally, in certain aspects a mixed-radix implementation separates the butterfly structure from the twiddle multiplication to take advantage of the high data rate-to-clock ratio and to use General-Purpose-Array-Processors (GPAPs) for the complex twiddle multiplication. Finally, the exemplary embodiment is particularly suited to a 2×2 MIMO system, capable of supporting up to 2 parallel data streams. However, the design is scalable and can easily be adapted for other MIMO configurations.

Figure 3:
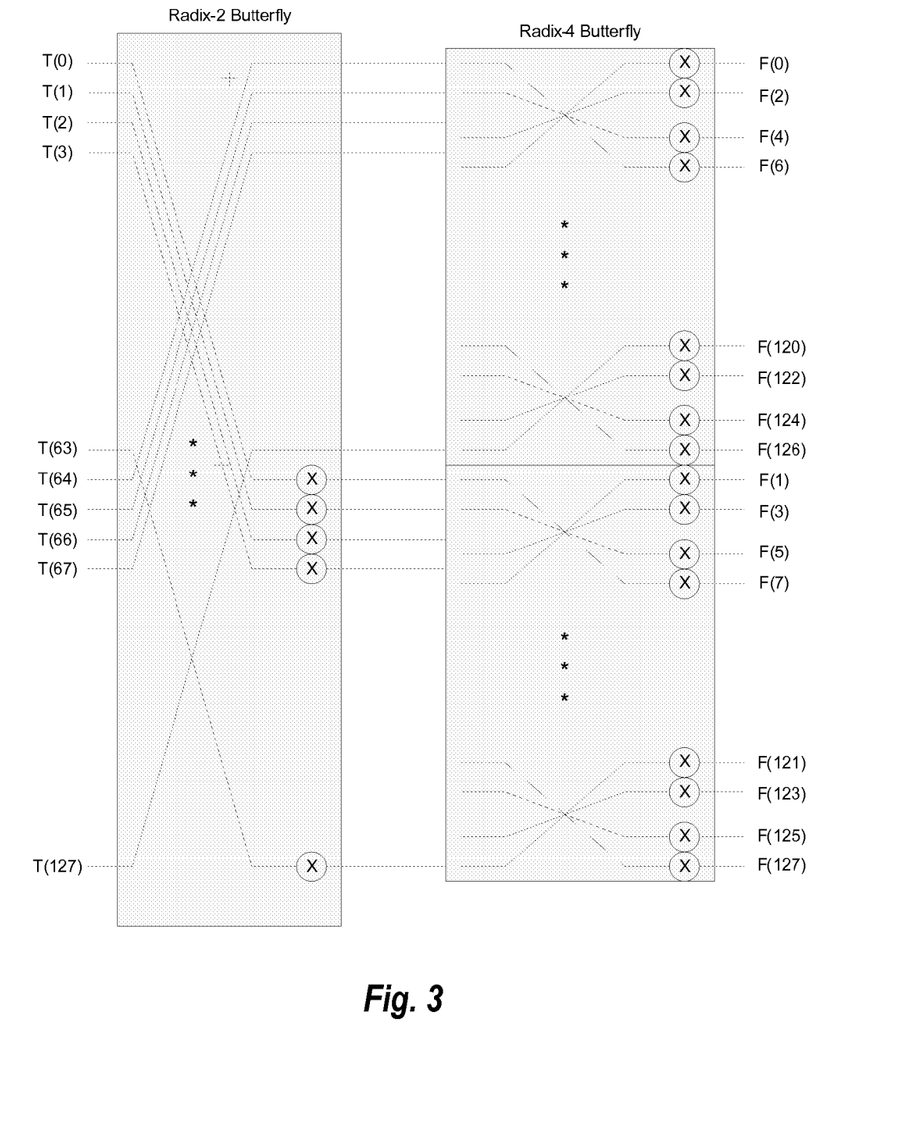
FIG. 3 is a block diagram of the structure of a mixed-radix butterfly according to aspects of an embodiment.

The exemplary mixed-radix implementation uses both radix-2 and radix-4 butterfly structures to perform both 64-pt and 128-pt FFTs and IFFTs. The structure can also be scaled to other numbers of input points, as may be required. According to one configuration, a 128-pt FFT is performed. Applying the time-domain sample points to the radix-2 butterfly decomposes of the 128-pt FFT operation into two 64-pt operations. The radix-4 butterfly performs two 64-pt FFTs using a minimum number of multiples. FIG. 3 shows the structure of the mixed-radix butterfly. Configured as shown, the mixed-radix structure of FIG. 3 illustrates the decomposition of a full 128-pt FFT operation using both radix structures.

The structure of FIG. 3. can be reconfigured using multiplexers to bypass the initial radix-2 butterfly, directing inputs straight into the radix-4 butterfly stage. Thus, both a 128-pt FFT and a 64-pt FFT operation can be performed using only a radix-2 butterfly and a radix-4 butterfly.

Both the radix-2 butterfly and the radix-4 butterfly implement a decimation-in-frequency (DIF) method to simplify the control logic between stages. Other methods optimized for other operational or construction parameters can be used. As FIG. 3 shows, according to the exemplary embodiment, the decomposition of the 128-pt FFT into two 64-pt FFTs requires multiplication of output values by twiddle factors relative to the full 128-pt unit circle. Following this stage, each radix-4 stage also includes twiddle factor multiplication. Implementing the radix-4 butterfly using the DIF approach maintains the butterfly-twiddle-butterfly-twiddle ordering.

The Inverse FFT operation (IFFT) is structurally identical to the FFT. The IFFT is obtained from the previously-described structure by reversing the signs of each of the twiddle factors (i.e., the rotation direction) and by also inverting the j-multiplication in the radix-4 butterfly.

To minimize hardware, all processing is sequential and makes use of GPAPs to perform twiddle multiplications. For example, as few as one radix-2 butterfly and one radix-4 butterfly, together with suitable storage, are sufficient to perform the required operations. Points are applied pair-wise to the radix-2 butterfly or in quads to the radix-4 butterfly, in order to perform the 128-pt or 64-pt FFT (or IFFT), respectively. This type of architecture will result in significant area savings for any device requiring the described FFT/IFFT functions.

The above architecture is suitable for the processing a single stream of data. Supporting multiple parallel streams, as in the case of a 2×2 MIMO system, simply adds additional hardware for data storage and butterfly interconnects, as well as additional GPAPs. The same control signals, addressing, and twiddle coefficients are used by the other parallel stream(s), yielding a scalable design applicable to various MIMO configurations.

The structure is cleanly divided into two sections or collections of modules, a control section and a datapath section. When scaling embodiments, identical datapath sections are used, so adding additional streams just adds the datapath sections, while the control section remains the same for different numbers of streams and datapaths.

A memory structure that easily supports the 64-pt and 128-pt operations for both FFT and IFFT operations may be employed. In a typical 802.11 implementation, the IFFT is used for packet transmits. The input data can be burst into the module at the relatively high processing speed, i.e. 200 MHz whereas the output data is regulated by the transmission data rate, i.e. 20 Mega-symbols per second (Msps) or 40 Msps. Conversely, the input data to the FFT during packet receives is limited to the same transmission data rate, i.e. 200 Msps or 40 Msps. The FFT output data can be burst out at the processing speed, i.e. 200 MHz for demodulation and decoding.

Figure 4:
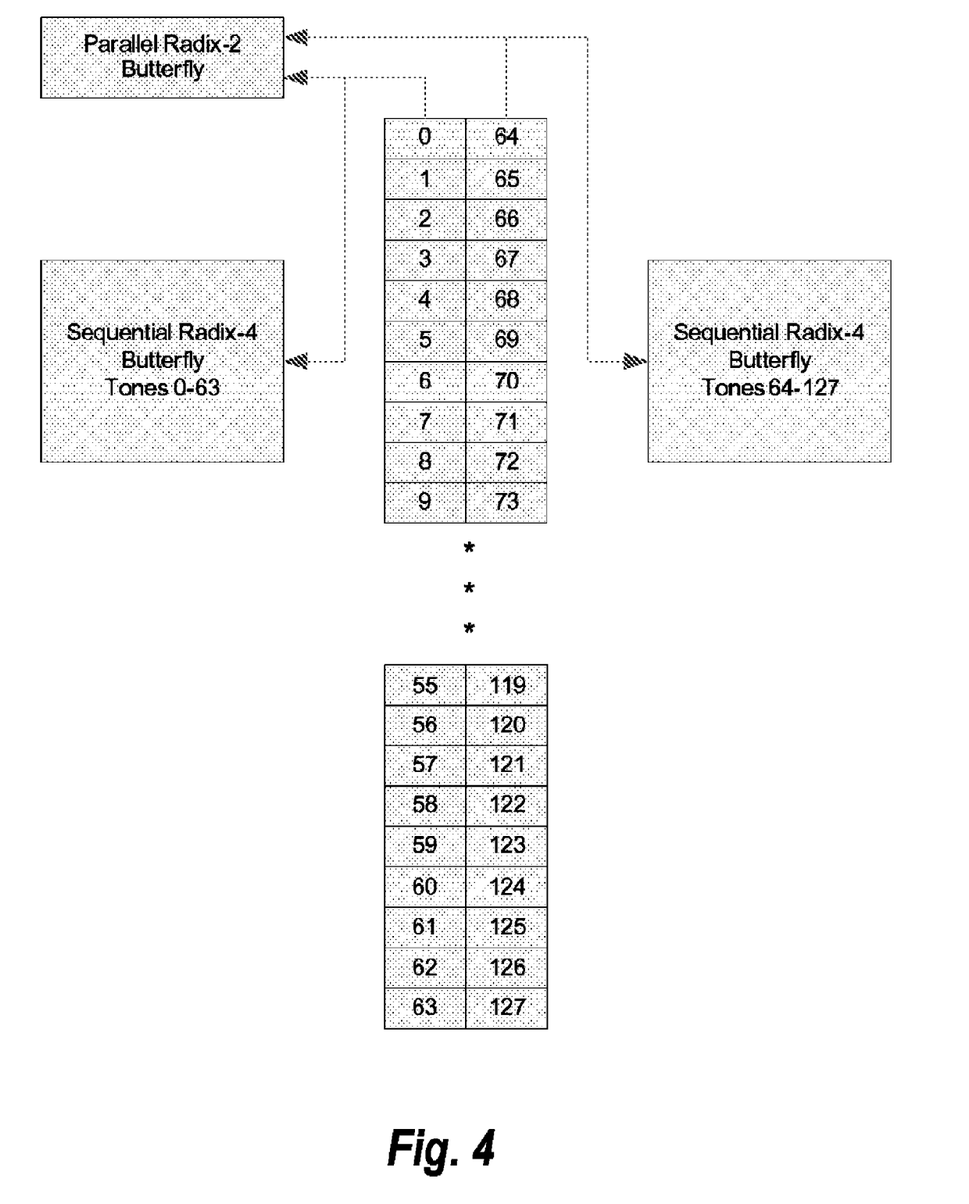
FIG. 4 is a block diagram of a memory structure illustrating aspects of an embodiment.
Figure 5:
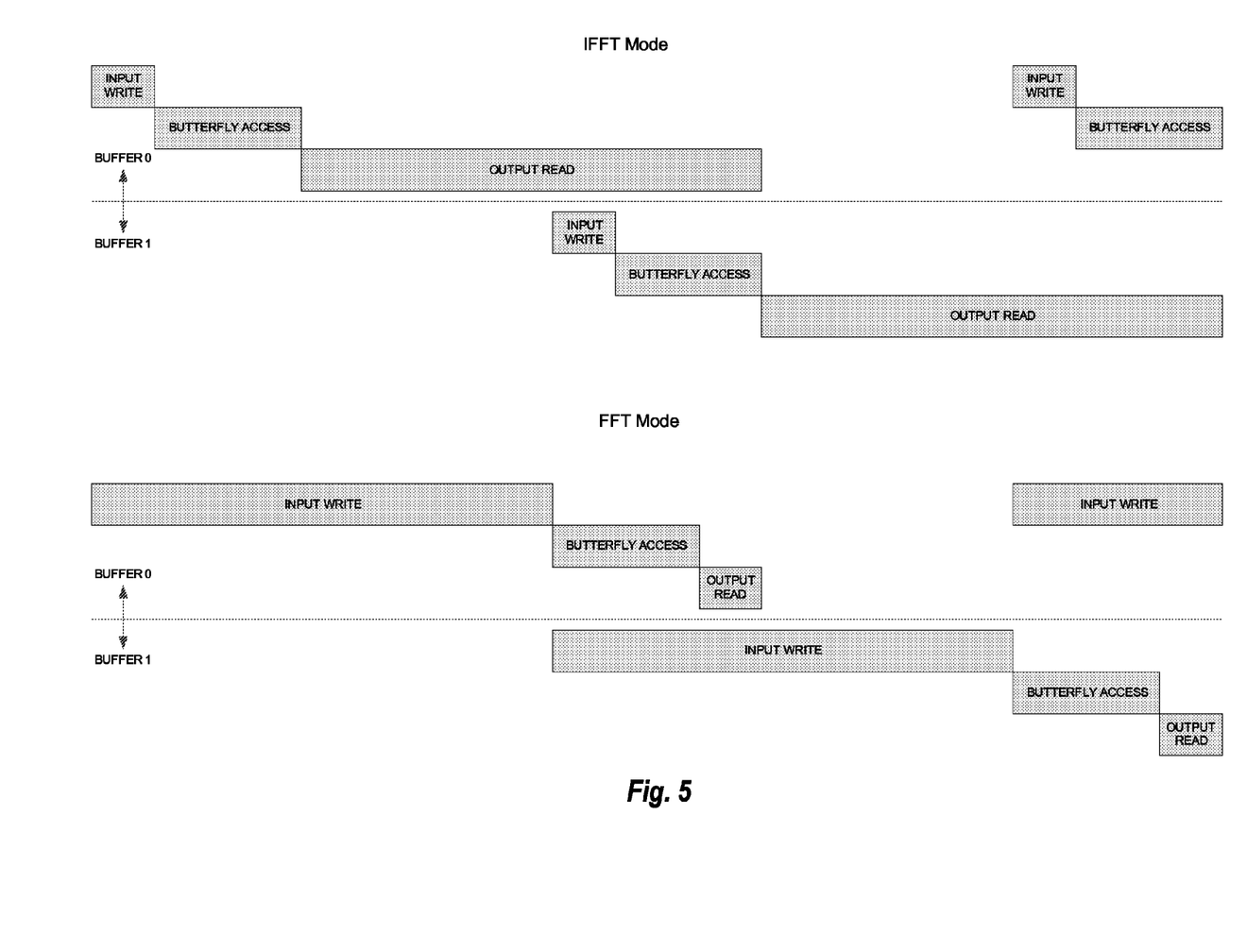
FIG. 5 is a timing diagram for the memory of FIG. 4.

With a data-rate-to-clock ratio of either 50 or 100, a double-buffer structure, as shown in FIG. 4, satisfies these assumptions. The double-buffers rotate usage based on control assignments. As shown in the timing diagram of FIG. 5, three modes are defined: input write, butterfly read and write, and output read. The mode assignments are sequenced to handle the different input and output scenarios described above. In IFFT mode, one buffer accepts the burst input and then performs the radix operations at clock speed. During this time, the second buffer is read out at the transmission data rate. Note this does not restrict the manner in which the output data is read—it can either be burst out or stalled between samples. The buffer is regulated in intervals of the transmission rate, e.g. every 4 μs for 802.11. For the first OFDM symbol, each mode progresses through the first buffer. To ensure that the transmission rate is maintained, the second OFDM symbol processing must begin sometime while the first symbol output data is read out. At this point the input mode initiates on the second buffer, and the process repeats. In FFT mode, the first OFDM symbol likewise progresses through the first buffer. However, since the input data is continuous, the second OFDM symbol is immediately started on the second buffer. Given the processing ratio, the first OFDM symbol butterfly and output operations are guaranteed to be complete before the second OFDM symbol has been completely written. FIG. 5 illustrates the memory mode overlap for FFT and IFFT processing. If the processing ratio were not sufficiently high to guarantee the illustrated timing, the memory structure would require dedicated buffers for each mode, or three buffers in the example shown.

Another feature of the memory structure of FIG. 4 is the manner in which data is processed within the buffers to support 64-pt and 128-pt operations. Each buffer is sized for the max 128 entry conditions, yet the buffer is arranged as 2×64, i.e., two parallel banks of 64 entries, rather than 1×128, i.e. one bank of 128 entries. Input data is written sequentially such that the entries separated by 64 are written into the two adjacent halves of the same addressable location, i.e. 65th entry occupies the second half of the same address as the 0th entry or (i, i+64). For example, if each entry is one byte wide and each addressable location is one word wide, i.e., two bytes wide, entry i may be written to the most significant byte of a word, and entry i+64 may be written to the least significant byte of the same word. Other entry sizes can be used, as desired to meet implementation and performance requirements. In the case of word-addressable memory, buffer byte-write enables, which provides a special addressing mode where only one byte of a word-addressable memory location is written without disturbing the other byte, allow this design assumption, which is the key to reusing control logic for both 64-pt and 128-pt operations because the entire entry pair (i, i+64) is read out at once in both 64-pt and 128-pt operations, as now explained. During a radix-2 butterfly, the decomposition combines data pairs separated by 64. Having both sets available in parallel allows the butterfly to be performed in a single cycle, or 64 cycles in total. During a radix-4 butterfly, four accesses are required for a 64-pt operation, but the reads provide the data for both 64-pt operations in the case of the 128-pt FFT. This parallel access means the second 64-pt operation does not impose any additional latency. For a 64-pt only operation, the data in entries 64-127 is simply ignored.

This memory structure describes the features needed for a single data stream. For N parallel streams, this structure would be replicated N times.

There are three addressing modes that track the three memory modes: input writes, butterfly access (reads and writes), and output reads. As mentioned prior, all address generation is independent of N, the number of parallel streams. The same addressing logic is shared by all processing streams.

Input writes are sequential, in order. However, the interface does support different conditions to match the operation (forward or inverse) and order (64-pt or 128-pt). During a packet reception, the input arrives in order regardless of order, one sample at a time. Receive mode matches the forward operation, so under this condition, the input is written sequentially from index 0 to 63 into the lower memory pair. In 128-pt mode, the input writes continue, again from index 0 to 63, but into the higher memory pair of the same memory buffer. For 64-pt mode, the input writes would be again into the lower memory pair, but into the other buffer. During a packet transmit, or inverse operation, it is assumed that the data is available in pairs in 128-pt mode. This way, the complete memory pair is written for each cycle from index 0 to 63. In 64-pt mode, only the lower memory pair is written.

For butterfly access, rather than using a LUT to store the addressing order for the radix-2 and radix-4 stages, simplified control logic has been created to generate the address on-the-fly. Considering the radix-4 operation first, a 64-pt FFT requires 3 stages with 16 butterflies each. Upon closer inspection of the addressing order in each stage of the DIF algorithm, the buffer address is a simple reordering of a module-64 counter (6 bits). In the first stage, the 4 inputs to each butterfly are separated by 16. By reordering the counter bits as [1:0][5:2], a sequential count produces values 0, 16, 32, 48, 1, 17, 33, 49, ... 15, 31, 47, 63. In the second stage, the 4 inputs are separated by 4. Reordering the counter bits as [5:4][1:0][3:2] produces values 0, 4, 8, 12, 1, 5, 9, 13, 2, 6, 10, 14, 3, 7, 11, 15, ... 51, 55, 59, 63. In the third and final stage, the 4 inputs are sequential, so the counter bits are not reordered.

The radix-2 operation involves 64 butterflies with inputs separated by 64. Given the buffer memory pairing described earlier, the radix-2 addressing can use any arbitrary ordering since each read access provides the two inputs already separated by 64. For simplification, the ordering matches the first stage of the radix-4 operation. So regardless of the FFT order (64 or 128), all addressing is contained within one 6 bit counter.

Output reads require special handling. The radix processing, though done in-place, produces outputs in bit-reverse order. Thus, the output addressing must reorder the indices. For a desired output sequence, this only requires bit-swapping the address bits from [5:0] to [1:0][3:2][5:4]. For 128-pt operations, the memory pairs are output at the same time. While separated in input by 64, the butterfly produces pairs that are sequential as outputs. In 64-pt mode, the output control simply does not trigger the output valid for the higher memory pair. This lends itself to seamless 64-pt and 128-pt processing.

Figure 6:
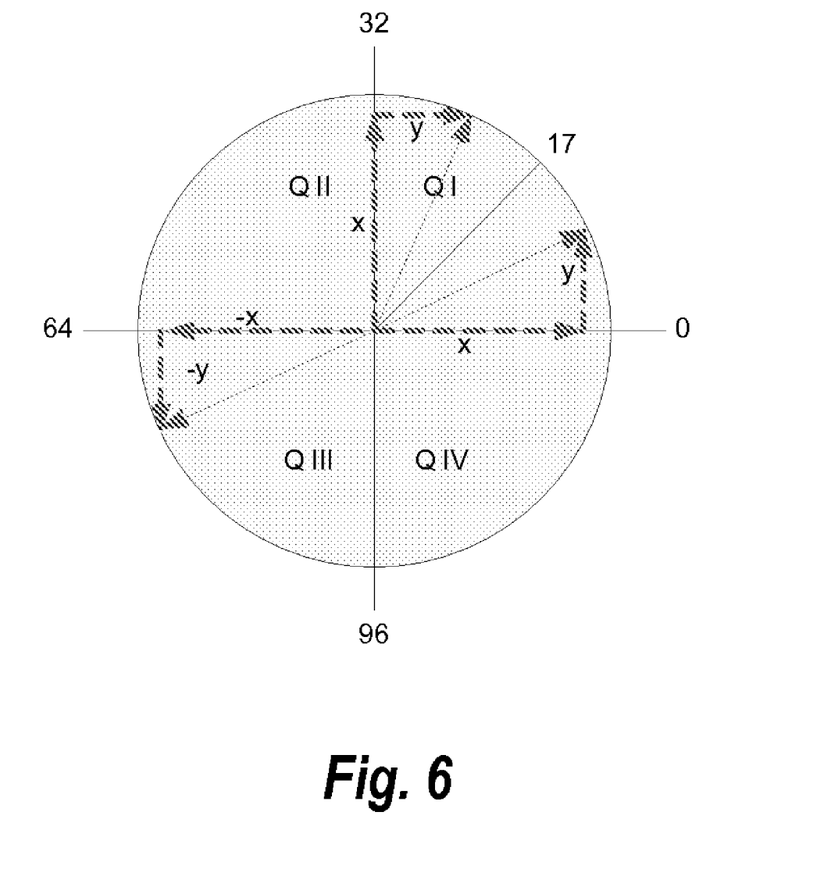
FIG. 6 is a plot of the unit circle showing the relationships between the twiddle factors according to aspects of an embodiment.

The twiddle factors depend on the radix and stage of processing. For the radix-2 stage, the twiddle factors are sequential around a 128-pt unit circle, as shown in FIG. 6, or Wn128 for n=0 ... 63. For the first radix-4 stage, the twiddle factors are again sequential, but in groups of 4 around a 64-pt unit circle, or Wnk64 for n=0 ... 15 and k=0 ... 3. For the second radix-4 stage, twiddle factors are again in groups of 4 but around a 16-pt unit circle, or Wnk16 for n=0 ... 3 and k=0 ... 3. In the final radix-4 stage, the twiddle factors are all 1s.

Rather than store all the coefficients into a lookup table (LUT), this exemplary embodiment chooses to generates the twiddle factors on-the-fly using a hybrid modulo-addressing and partial LUT method. Using the 128-pt unit circle as a reference (see, FIG. 6), the cosine and sine values within each quadrant is a mirror copy of another, and the values within a given quadrant can be further be mirrored around the midpoint. Hence, the partial LUT needs only to store half a quadrant's worth of "x" and "y" values, or 128/4/2+1=17 entries (the 17th entry is the mid-point to mirror the values around). FIG. 6 below illustrates how the ½ quadrants maps to cosine and sine values around the unit circle.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of this disclosure.

The invention claimed is:

1. A processor for performing a Fast Fourier Transform (FFT), comprising:
   at least one radix-2 butterfly structure;
   at least one radix-4 butterfly structure;
   a buffer structure for inputting a data stream and storing data output from the radix-2 and radix-4 butterfly structures;
   FFT logic configured to perform an FFT on a data stream in multiple stages by alternately coupling the data stream to inputs of the radix-2 butterfly structure or to inputs of the radix-4 butterfly structure, the FFT logic being capable of performing at least two different resolution fast Fourier transforms dependent on the inputs selected; and
   address generation logic configured to generate buffer addresses for the buffer structure during the multiple stages by reordering bits of a sequential counter, and
   wherein the buffer structure is structured in a parallel paired configuration such that addressing for the radix-4 butterfly structure at a first resolution is reusable for addressing the radix-2 butterfly structure at a second resolution.

2. The processor of claim 1, further comprising: inverse FFT (IFFT) logic configured to perform an IFFT on a receive data stream in multiple stages by alternately coupling the receive data stream to inputs of the radix-2 butterfly structure or to inputs of the radix-4 butterfly structure, the IFFT logic being capable of performing at least two different resolution IFFTs dependent on the inputs selected.

3. The processor of claim 1, wherein: the buffer structure comprises at least first and second buffers, each arranged as parallel banks of N entries; and entries separated by N are written into adjacent halves of the same addressable location.

4. The processor of claim 3, wherein: each entry is one byte wide; each addressable location is two bytes wide; and entries separated by N are written to most significant and least significant bytes of the same addressable word.

5. The processor of claim 4, wherein pairs of bytes written into the same addressable word are read out from the buffer structure simultaneously when addressed with a buffer address corresponding to the addressable word.

6. The processor of claim 1, wherein
the FFT logic performs the FFT operation in at least first and second stages; and
the address generation logic generates the buffer addresses by reordering bits of the sequential counter in a first manner to produce buffer addresses separated by a first amount in the first stage and by reordering bits of the sequential counter in a second manner to produce buffer addresses separated by a second amount in the second stage.

7. An apparatus for wireless communication, comprising:
at least one radix-2 butterfly structure;
at least one radix-4 butterfly structure;
a buffer structure for inputting a data stream and storing data output from the radix-2 and radix-4 butterfly structures, wherein the buffer structure is structured in a parallel paired configuration such that addressing for the radix-4 butterfly structure at a first resolution is reusable for addressing the radix-2 butterfly structure at a second resolution;
Fast Fourier Transform (FFT) logic configured to generate a transmit symbol by performing an FFT on a data stream in multiple stages by alternately coupling the data stream to inputs of the radix-2 butterfly structure or to inputs of the radix-4 butterfly structure, the FFT logic being capable of performing at least two different resolution fast Fourier transforms dependent on the inputs selected;
address generation logic configured to generate buffer addresses for the buffer structure during the multiple stages by reordering bits of a sequential counter; and
a transmitter for transmitting the transmit symbol.

8. The apparatus of claim 7, further comprising: inverse FFT (IFFT) logic configured to perform an IFFT on a receive data stream in a multiple stages by alternately coupling the receive data stream to inputs of the radix-2 butterfly structure or to inputs of the radix-4 butterfly structure, the IFFT logic being capable of performing at least two different resolution IFFTs dependent on the inputs selected.

9. The apparatus of claim 7, wherein: the buffer structure comprises at least first and second buffers, each arranged as parallel banks of N entries; and entries separated by N are written into adjacent halves of the same addressable location.

10. The apparatus of claim 9, wherein: each entry is one byte wide; each addressable location is two bytes wide; and entries separated by N are written to most significant and least significant bytes of the same addressable word.

11. The apparatus of claim 10, wherein pairs of bytes written into the same addressable word are read out from the buffer structure simultaneously when addressed with a buffer address corresponding to the addressable word.

12. The apparatus of claim 7, wherein
the FFT logic performs the FFT operation in at least first and second stages; and
the address generation logic generates the buffer addresses by reordering bits of the sequential counter in a first manner to produce buffer addresses separated by a first amount in the first stage and by reordering bits of the sequential counter in a second manner to produce buffer addresses separated by a second amount in the second stage.

13. A method for performing a fast Fourier transform (FFT), comprising:
performing a Fast Fourier Transform (FFT) on a data stream in multiple stages by alternately coupling the data stream to inputs of a radix-2 butterfly structure or to inputs of a radix-4 butterfly structure;
selecting one of at least two different resolution fast Fourier transforms to be performed on said data stream dependent on the inputs; and
generating buffer addresses for transferring data into or out of a buffer structure during the multiple stages of the FFT by reordering bits of a sequential counter, the buffer structure comprising at least first and second buffers arranged as parallel banks of N entries; and entries separated by N are written into adjacent halves of the same addressable location.

14. The method of claim 13, wherein:
each entry is one byte wide;
each addressable location is two bytes wide; and
entries separated by N are written to most significant and least significant bytes of the same addressable word.

15. The method of claim 14, wherein pairs of bytes written into the same addressable word are read out from the buffer structure simultaneously when addressed with a buffer address corresponding to the addressable word.

16. The method of claim 13, wherein
the FFT logic performs the FFT operation in at least first and second stages; and
the address generation logic generates the buffer addresses by reordering bits of the sequential counter in a first manner to produce buffer addresses separated by a first amount in the first stage and by reordering bits of the sequential counter in a second manner to produce buffer addresses separated by a second amount in the second stage.

17. An apparatus for performing a fast Fourier transform (FFT), comprising:
means for performing a Fast Fourier Transform (FFT) on a data stream in multiple stages by alternately coupling the data stream to inputs of a radix-2 butterfly structure or to inputs of a radix-4 butterfly structure, whereby at least two different resolution fast Fourier transforms may be performed dependent on the inputs selected; and
means for generating buffer addresses for transferring data into or out of a buffer structure during the multiple stages of the FFT by reordering bits of a sequential counter, wherein the buffer structure is structured in a parallel paired configuration such that addressing for the radix-4 butterfly structure at a first resolution is reusable for addressing the radix-2 butterfly structure at a second resolution.

18. The apparatus of claim 17, wherein: the buffer structure comprises at least first and second buffers, each arranged as parallel banks of N entries; and entries separated by N are written into adjacent halves of the same addressable location.

19. The apparatus of claim 18, wherein: each entry is one byte wide; each addressable location is two bytes wide; and entries separated by N are written to most significant and least significant bytes of the same addressable word.

20. The apparatus of claim 19, wherein pairs of bytes written into the same addressable word are read out from the buffer structure simultaneously when addressed with a buffer address corresponding to the addressable word.

21. The apparatus of claim 17, wherein
the means for performing the FFT includes means for performing the FFT operation in at least first and second stages; and
the means for generating the buffer addresses includes means for generating the buffer addresses by reordering bits of the sequential counter in a first manner to produce buffer addresses separated by a first amount in the first stage and by reordering bits of the sequential counter in a second manner to produce buffer addresses separated by a second amount in the second stage.

22. A software storage apparatus for performing a fast Fourier transform (FFT) including a memory having instructions stored thereon, wherein the instructions are executable by one or more processors, the instructions comprising:
code for performing a Fast Fourier Transform (FFT) on a data stream in multiple stages by alternately coupling the data stream to inputs of a radix-2 butterfly structure or to inputs of a radix-4 butterfly structure, whereby at least two different resolution fast Fourier transforms may be performed dependent on the inputs selected; and
code for generating buffer addresses for transferring data into or out of a buffer structure during the multiple stages of the FFT by reordering bits of a sequential counter, the buffer structure being structured in a parallel paired configuration such that addressing for the radix-4 butterfly structure at a first resolution is reusable for addressing the radix-2 butterfly structure at a second resolution.

23. The software storage apparatus of claim 22, wherein: the buffer structure comprises at least first and second buffers, each arranged as parallel banks of N entries; and entries separated by N are written into adjacent halves of the same addressable location.

24. The software storage apparatus of claim 23, wherein: each entry is one byte wide; each addressable location is two bytes wide; and entries separated by N are written to most significant and least significant bytes of the same addressable word.

25. The software storage apparatus of claim 24, wherein pairs of bytes written into the same addressable word are read out from the buffer structure simultaneously when addressed with a buffer address corresponding to the addressable word.

26. The software storage apparatus of claim 22, wherein
the code for performing the FFT includes code for performing the FFT operation in at least first and second stages; and
the code for generating the buffer addresses includes code for generating the buffer addresses by reordering bits of the sequential counter in a first manner to produce buffer addresses separated by a first amount in the first stage and by reordering bits of the sequential counter in a second manner to produce buffer addresses separated by a second amount in the second stage.

* * * * *